Oct. 1, 1929.  C. LORBER  1,729,621

SWIVEL KEY HOOK

Filed June 29, 1928

INVENTOR.
Charles Lorber,
BY
ATTORNEY.

Patented Oct. 1, 1929

1,729,621

UNITED STATES PATENT OFFICE

CHARLES LORBER, OF BLOOMFIELD, NEW JERSEY

SWIVEL KEY HOOK

Application filed June 29, 1928. Serial No. 289,118.

This invention relates to hooks such as are used in key cases and other like situations. More especially the invention relates to a swivel key hook of the general type shown in my prior Patent 1,623,627 and in my co-pending application bearing the Serial Number 284,732 and filed June 12, 1928.

I am aware of the fact that suspension rings have been swiveled to key hooks but it is the natural law that a constant swivel motion, one part in another, as in such hooks results in the hole in the hook proper or the head on the swivel or both becoming so worn that the parts will become detached and thus the hook lost. Prior to my invention swivels for this purpose have been devised such as that shown in my prior Patent 1,596,055, wherein the head on the hook is concealed within the swivel so that this wear cannot be detected.

One important object of the present invention is to provide for entire visibility of the hook and swivel so that the owner of the key case in which such a hook is used may notice the wear and thus be advised to make such adjustments or repairs before the parts become detached and the key lost.

Again, it has been quite common to provide key hooks with an eye at one end and the bill portion bent in against the back at some distance below the eye. The eye thus has no function as a stop to prevent accidental detachment of a key from its hook.

A second important object of the invention is to provide an improved form of key hook wherein the bill engages a side of the eye, that side being so arranged as to have an end against which a key moved, either accidentally or purposely, into the upper part of the hook will engage so that this end forms an abutment or stop for the key and it is necessary to spring the bill well away from the eye in order to detach the key from the hook.

A third important object of the invention in thus having the bill resting against the eye and the head of the swivel within the open eye is to have these parts in such close proximity that the user, in applying or removing a key, cannot fail to notice whether or not the head is worn.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1:
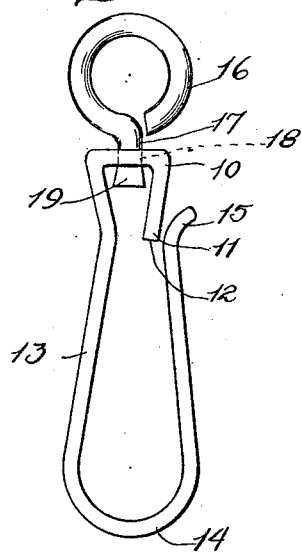
Figure 1 is a side elevation of one form of the key hook.
Figure 2:
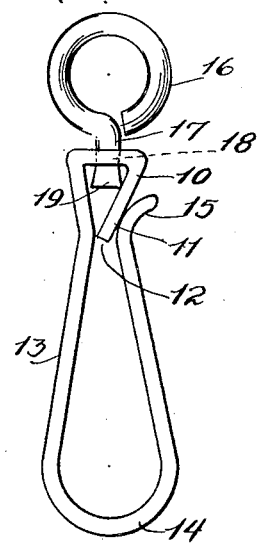
Figure 2 is a side elevation of a slightly modified form.
Figure 3:
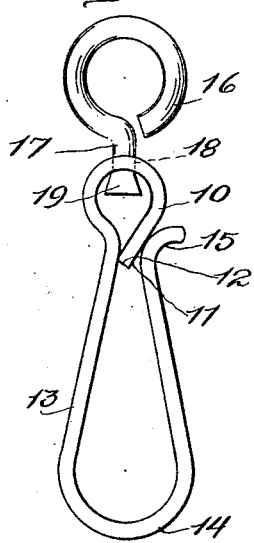
Figure 3 is a side elevation of a considerably modified form of hook.
Figure 4:
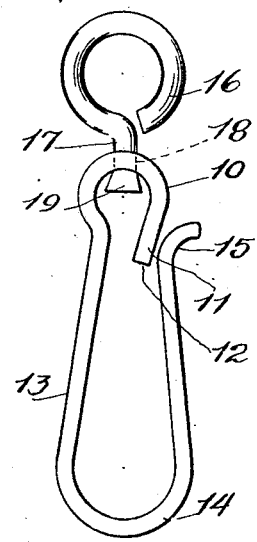
Figure 4 is a side elevation of a form of hook slightly modified from Figure 3.

In the various embodiments of the invention herein illustrated it will be noted that this key hook consists of a swivel ring and a hook proper. The hook proper is made from a single length of wire of suitable material and cross section and the material is preferably resilient. At one end the wire is bent to form an eye 10 having an extremity 11 acutely angled with respect to the other side of the eye and thus not forming the usual circular ring. Under these conditions the extremity presents a flat surface 12 toward the lower part or body of the hook. The remaining side of the eye has the length of material extending downwardly therefrom as at 13 to form the back of the hook and is then bent to form the bight 14 and extended upwardly to terminate in the bill 15 which rests against the straight portion of the first terminal and forming the front side of the eye. Now under these conditions a key engaged on the hook and moved upwardly will contact with this flat end and tend either to pass into the eye in the forms shown in Figures 1 and 4 or to stop further upward movement in the forms shown in Figures 2 and 3. In either case, in order to detach the hook, it is necessary to forcibly pull the bill portion 15 away from the eye. At 16 is a ring by means of which the hook may be attached to a key case or plate in any suitable manner such as shown in my previously mentioned patents and application and this hook is provided with a shank 17 which passes rotatably through an opening 18 formed in the upper portion of the eye 10 and thus has its extremity extending into the eye where it is there flattened to spread it laterally and form a head 19. Under these conditions this head is visible from either side of the eye and each time the owner uses the key hung on this hook the head will be visible and any wear noticeable and this is especially true when he applies or removes a key since at that time he must look at the parts adjacent the eye and one cannot fail to notice the condition of the opening 18 or head 19.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. A swivel hook for keys and the like including a hook proper and a ring swiveled thereto, said hook having an open eye at one end and the ring having a shank extending through the material of the eye at the top thereof and having a laterally flattened head in the open part of the eye whereby the head is constantly visible and wear thereon may be noted.

2. A key hook consisting of a single length of material bent at one end to form an eye with the extremity of the length of material acutely angled with respect to the other side of the eye to present a flat surface toward the remainder of the hook, the length of material being extended downwardly to form the back of the hook and there bent upwardly to form the front of the hook, said length of material terminating in a bill portion contacting with the outer side of the first terminal portion whereby the end of said first terminal portion forms a stop for preventing accidental withdrawal of a key from the hook.

3. A key hook consisting of a single length of material bent at one end to form an eye with the extremity of the length of material acutely angled with respect to the other side of the eye and contacting therewith to present a flat surface toward the remainder of the hook, the length of material being extended downwardly to form the back of the hook and there bent upwardly to form the front of the hook, said length of material terminating in a bill portion contacting with the outer side of the first terminal portion whereby the end of said first terminal portion forms a stop for preventing accidental withdrawal of a key from the hook.

4. A key hook consisting of a single length of material bent at one end to form an eye with the extremity of the length of material acutely angled with respect to the other side of the eye to present a flat surface toward the remainder of the hook, the length of material being extended downwardly to form the back of the hook and there bent upwardly to form the front of the hook, said length of material terminating in a bill portion contacting with the outer side of the first terminal portion whereby the end of said first terminal portion forms a stop for preventing accidental withdrawal of a key from the hook; in combination with a ring having a shank extending rotatably through the material at the top of the eye and headed within the open portion of the eye whereby the head is visible in said open portion and wear thereof may be detected, the end of the material forming the eye engaging the back portion to close off the eye from the remainder of the hook and thereby prevent interference of a key on said hook with the flattened end of the swivel shank.

5. A key hook consisting of a single length of material bent at one end to form an eye with the extremity of the length of material acutely angled with respect to the other side of the eye and contacting therewith to present a flat surface toward the remainder of the hook, the length of material being extended downwardly to form the back of the hook and there bent upwardly to form the front of the hook, said length of material terminating in a bill portion contacting with the outer side of the first terminal portion whereby the end of said first terminal portion forms a stop for preventing accidental withdrawal of a key from the hook; in combination with a ring having a shank extending rotatably through the material at the top of the eye and headed within the open portion of the eye whereby the head is visible in said open portion and wear thereof may be detected, the end of the material forming the eye engaging the back portion to close off the eye from the remainder of the hook and thereby prevent interference of a key on said hook with the flattened end of the swivel shank.

In testimony whereof I affix my signature.

CHARLES LORBER.